Aug. 14, 1945.   G. C. JOHNSON ET AL   2,382,421
HYDRAULIC GAS COMPRESSOR
Filed April 22, 1944   3 Sheets-Sheet 3

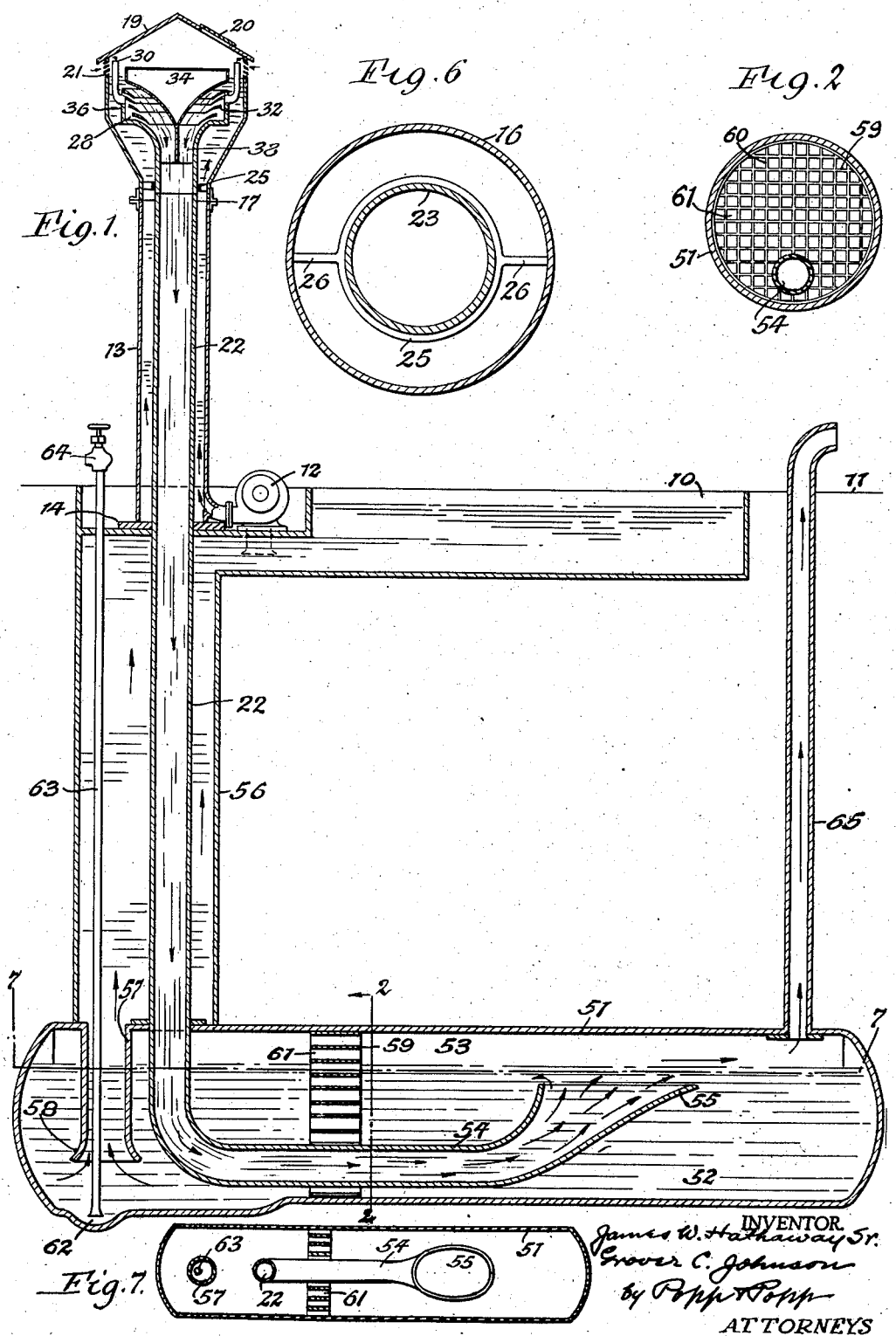

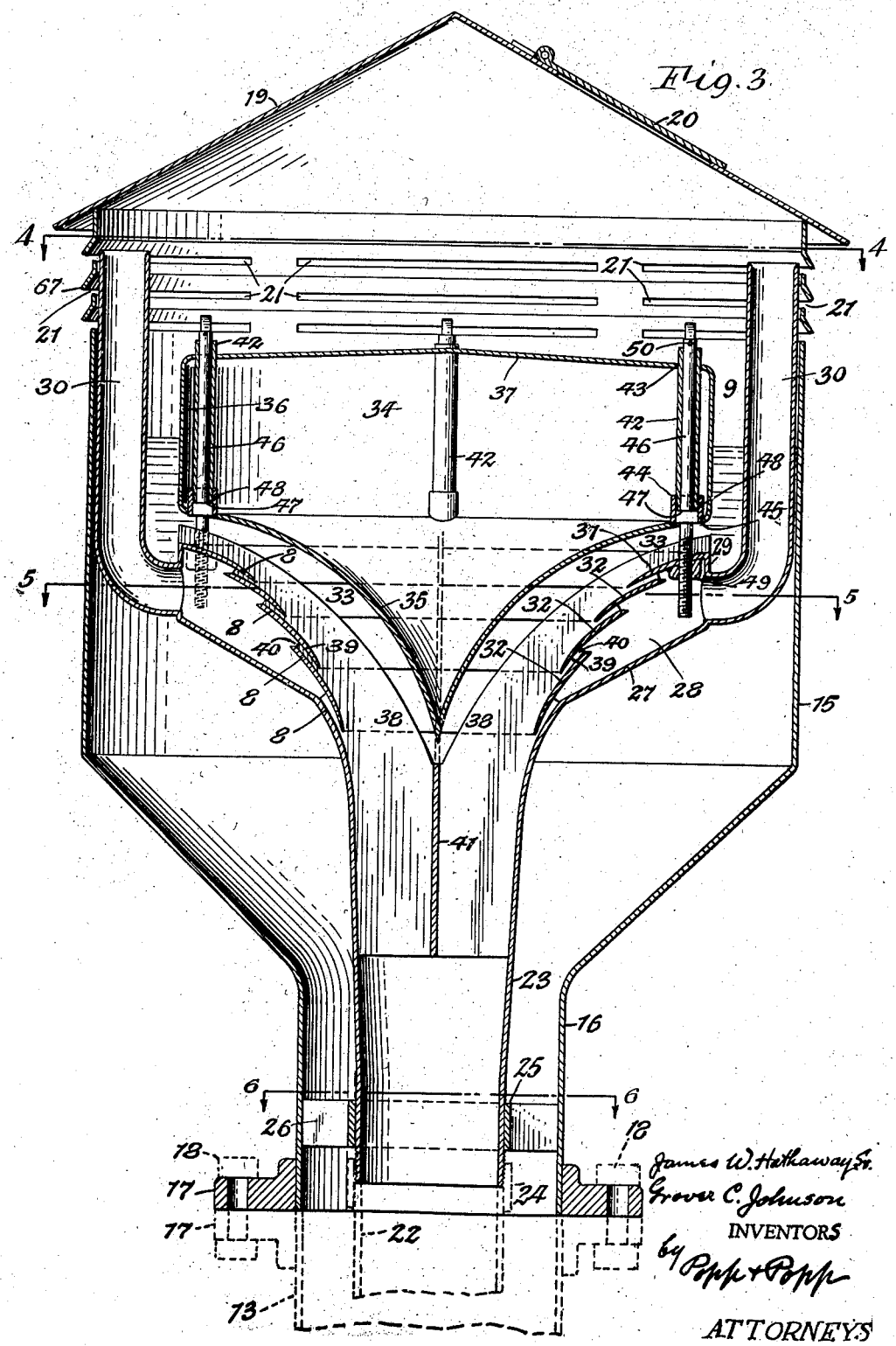

INVENTORS:
James W. Hathaway Sr.
Grover C. Johnson
BY Popp & Popp
ATTORNEYS

Patented Aug. 14, 1945

2,382,421

UNITED STATES PATENT OFFICE 2,382,421

HYDRAULIC GAS COMPRESSOR

Grover C. Johnson and James W. Hathaway, Sr., Buffalo, N. Y., assignors to Buffalo Compressor and Air Conditioning Corporation, Buffalo, N. Y., a corporation of New York Application April 22, 1944, Serial No. 532,288

16 Claims. (Cl. 230—105)

This invention relates to an apparatus for compressing gas, such as air, and more particularly to an apparatus of this character in which water is circulated and alternately lifted by power from a low altitude to a high altitude and permitted to drop by gravity from a high altitude to a low altitude, and in which air or gas is entrained in and compressed by the falling water and the compressed air is separated from the water preparatory to being again elevated during each cycle of operations.

It is the object of this invention to provide an improved compressor of this type whereby more air is entrained in and compressed by a given amount of falling water and the compressed air is separated from the water more rapidly so as to increase the efficiency of the apparatus to provide reliable and readily operable means for adjusting the mechanism for entraining the air in the water as best suits particular conditions under which the apparatus is operating.

In the accompanying drawings:

Fig. 1 is a vertical section, on a reduced scale, of a hydraulic gas compressing apparatus embodying this invention.

Fig. 2 is a vertical section of the same, taken on line 2—2, Fig. 1.

Fig. 3 is a vertical section, on an enlarged scale, of the mechanism whereby the air is entrained in a falling stream of water in accordance with this invention.

Figs. 4, 5 and 6 are horizontal sections, taken on the correspondingly numbered lines in Fig. 3.

Fig. 7 is a horizontal section, on a reduced scale, taken on line 7—7, Fig. 1.

In the following description the same reference characters indicate like parts in the several figures of the drawings.

Figure 4:
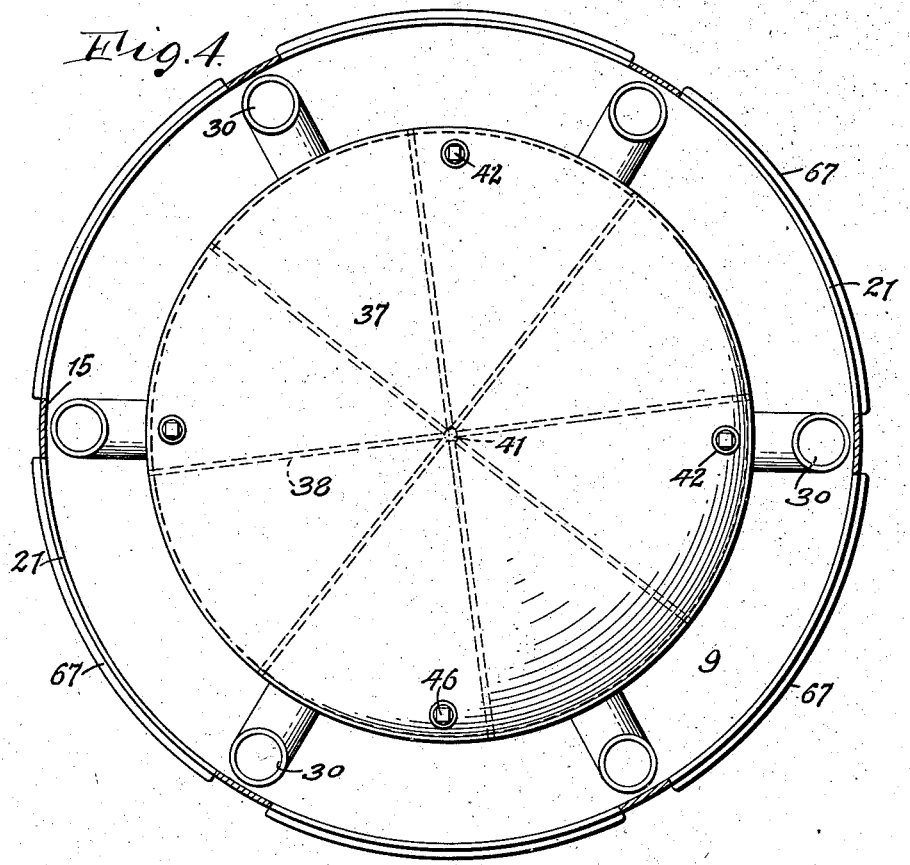

In its general organization this gas compressing apparatus comprises an elevated mixing head or entraining device whereby air is entrained in water, lifting means whereby water is taken from a supply source arranged at an intermediate level and delivered to said entraining device, a separating device arranged at a lower level and adapted to receive the mixed air and water from said entraining device and separate them, and means for returning the air-free water from said separating device to said lifting means.

The water used in the operation of this apparatus is preferably taken from a reservoir or tank 10 which is arranged at the level 11 of the ground, or substantially so, which is intermediate the highest and lowest altitude reached by the water as it circulates during each cycle of operations of the apparatus. From this reservoir the water is withdrawn by a pump 12 which may be of any suitable character and operated by any available power for delivering the water to the lower end of an uptake or water supply pipe 13. As shown in Fig. 1, the lower end of the uptake pipe is closed and rests on a base 14, and from the upper end of this pipe the water is delivered to the mixing device whereby air is entrained in the water. This mixing device in the preferred form shown in the drawings is constructed as follows:

Above the uptake pipe 14 is arranged an intake head which has an upper cylindrical delivery body 15 of considerably larger diameter than the uptake pipe, and a lower water intake neck 16 which together form the wall of an air and water intake chamber 9. This neck is preferably of the same diameter as the uptake water pipe 13 and detachably connected therewith so as to practically form a part thereof by coupling flanges 17 secured to the opposing ends of this pipe and neck and connected with each other by bolts 18. The upper end of this intake chamber is closed by a cover or roof 19 of upwardly tapering form and access to the interior of this chamber is afforded by an opening in this cover which is normally closed by a lid 20 hinged to the cover. The air to be compressed is admitted to the upper part of the intake head through a plurality of elongated openings or slots 21 which are formed in the upper part of the body or side wall of this head and arranged in groups around the circumference of this body. Rain is prevented from entering the intake head through these slots by means of visors or shields 67 inclining outwardly and downwardly from the upper edge of these openings, as best shown in Fig. 3.

Within the intake head is arranged a siphon or suction device whereby water taken from the lower part of the intake head is caused to draw air from the upper part of this head and discharge the same in a mixed condition downwardly through a compression or downtake pipe 22 so that the air is compressed as it falls with this water from the upper to the lower end of this downtake pipe. This downtake pipe extends through the base 14 which closes the lower end of the water uptake pipe 13 and has its upper part arranged centrally within the uptake pipe 13 while its lower part below the closure 14 is arranged within an upright water return pipe 23 which has its upper end communicating with the water reservoir 10 for a purpose which will presently appear. This siphon or suction device for entraining the air in the water is constructed as follows:

The numeral 23 represents a downwardly tapering induction or compression tube which is arranged centrally within the lower part of the intake head and has its lower end connected with the upper end of the compression pipe 22 by a screw sleeve 24, as shown in Fig. 3, or by any other suitable coupling means. The compression tube 22 and the induction tube which in effect is part of the compression tube are maintained in a central position relative to the intake head and the uptake pipe 13 by a spider consisting preferably of a centering and supporting collar 26 surrounding the lower part of the induction tube and provided with a plurality of centering fins 26 which project laterally from different parts of its periphery into engagement with different parts of the bore of the neck 16 of the intake head, as shown in Figs. 3 and 6.

The upper end of the induction tube 23 connects with the lower inner edge of an upwardly flaring flange 27 which forms the bottom of an annular air chamber 28 with the intake head. From the outer edge of this bottom a cylindrical flange 29 projects upwardly and forms an annular outer wall of the air chamber 28. This wall is spaced from the upright wall 15 of the air and water intake chamber 9 and in this space are located a plurality of air intake tubes 30, each of which has an upright upper part opening at its upper end into the air space in the upper part of the intake head and an inwardly curved lower part which connects with the wall 29 of the air chamber and communicates with the interior of the latter.

At the upper end of the air chamber 28 is arranged a downwardly tapering or conical induction or siphon ring 31 which is preferably of downwardly and inwardly curved form in cross section and connected at its outer elevated edge with the upper edge of the upright wall 29 of the air chamber 28. In the space between this upper induction ring 31 and the upper end of the lower induction tube 23 a plurality of intermediate induction or siphon rings 32 are arranged in the form of a vertical stack or tier, which intermediate induction rings are of progressively smaller diameter from the uppermost to the lowermost of the series. Each of these induction rings has its inner edge overlapping the outer edge of the next lower induction ring and the lowermost induction ring has its inner edge overlapping the inner side of the induction tube, and the overlapping parts of these members are spaced from each other so as to form an annular downwardly tapering or conical siphoning passage 8 between the overlapping parts of each adjacent two of these members. By this means these induction rings form the inner wall of the air chamber 28 and the several passages 8 establish communication between the air chamber 28 and the mixing passage 33 which is formed by the space surrounded by the several induction rings.

Within the induction chamber is arranged an induction head 34 which comprises a lower downwardly tapering or conical bottom 35 projecting downwardly into the central part of the mixing passage or chamber 33, an upright cylindrical side wall 36 projecting upwardly from the outer edge of the conical bottom 35 into the upper part of the air and water intake chamber 9, and a top 37 connected with the upper edge of the side wall 36 so that the head 34 consisting of the bottom 35, side wall 36 and top 37 forms a sealed hollow member which floats in the water within the lower part of the air and water intake chamber 9 and has its lower conical part immersed therein, while the upper cylindrical part thereof projects above the water level and into the air space within the upper part of the air and water intake chamber, as best shown in Fig. 3. The conical bottom of the induction head is spaced from the several conical induction rings by the annular mixing passage 33. This mixing passage has the general shape of an inverted flaring bell or trumpet through which a correspondingly shaped stream flows downwardly, which stream is composed of a mixture of water taken from the upper part of the intake chamber 9 and air taken from the air chamber 28 and drawn by suction or siphonic action through the several induction passages 32 into the mixing passage 33. By these means the air is entrained in the water and compressed by the same as this fluid mixture falls by gravity through the compression pipe 22 from the upper to the lower end of the latter.

The several induction rings are connected with each other and the induction tube 23 by bracing means so that the same and the bottom and side walls 27, 29 practically form an integral unit, which bracing means also serve to prevent the stream of air and water while flowing downwardly through the induction passage 33 from whirling and producing a vortex. In their preferred form these bracing means comprise a plurality of upright radial webs or vanes 38 arranged equidistant in an annular row in the space between the bottom of the induction head 34 and the induction rings 31, 32 and tube 23. Each of these webs engages the curved outer edge of its upper part with the inner side of the several induction rings and secured thereto by brazing or otherwise, and this outer edge portion is provided with a vertical row of upwardly opening slots 39 which receives the inner tapering edge of one of the induction rings and forms an upwardly projecting spacing finger 40 which bears against the opposing sides of the overlapping parts of the respective induction rings and the induction tube 23. The lower part of the outer edge of each spacing web engages with the inner side of the induction tube 23 and the lower parts of the inner edges of these webs engage each other, as shown at 41, thereby mutually supporting each other. These bracing webs, therefore, perform the dual function of tying together the several members of the induction unit but also preventing the stream of mixed water and air from whirling, thereby shortening the path of the stream and also preventing a reduction in the output of compressed air which otherwise would occur if the stream of air and water were permitted to form a vortex preparatory to entering the compression pipe 22.

Figure 5:
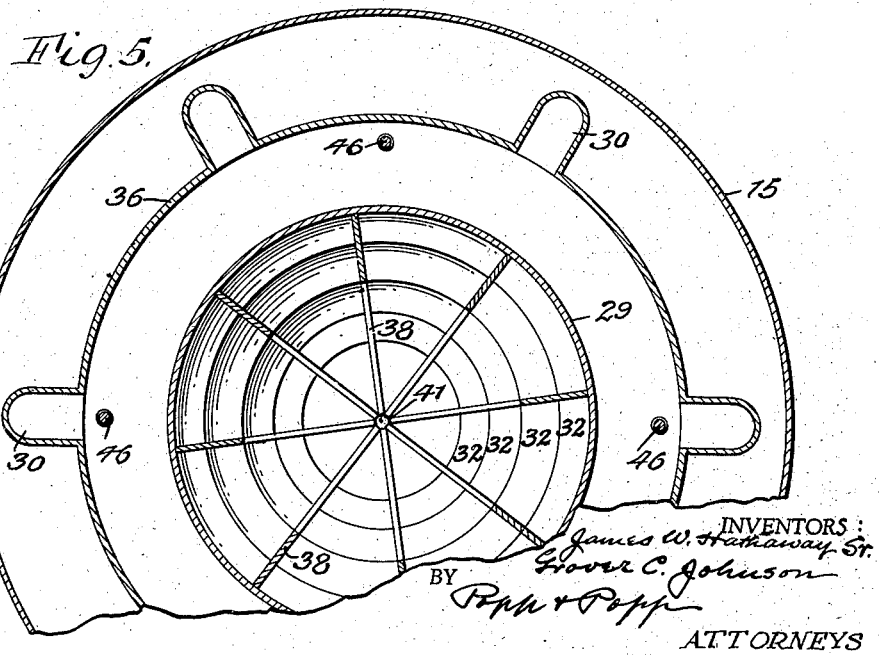

Means are provided for adjusting the induction head vertically for the purpose of varying the cross section of the mixed stream of air and water flowing downwardly through the mixing passage 33 and obtaining the maximum compression of air from a given head of water. Although this adjustment may be effected by various means, those shown in the drawings are preferred and constructed as follows:

The numeral 42 represents a plurality of upright bearing tubes arranged in an annular row around the peripheral part of the induction head within the side wall thereof and each having its upper part secured in an opening 43 in the top 37 and connected at its lower end with a sleeve 44 which is secured in an opening 45 in the marginal part of the conical bottom 35. The numeral 46 represents a plurality of adjusting posts, one of which rotates in each of the bearing tubes 42 and is provided with an upwardly facing shoulder 47 which engages with a downwardly facing internal shoulder 48 formed between the respective bearing tube 42 and its sleeve 44 so that the induction head is supported on these posts and is caused to move vertically therewith upon raising and lowering the posts. The lower ends of the adjusting posts are provided with screw threads and each engage with a screw nut 49 which is secured to the uppermost induction ring 31. Each of the adjusting posts has its upper end projecting above the upper end of the respective bearing tube and so that the same is accessible for rotation. This is preferably effected by making the upper end of each adjusting post square, as shown in Figs. 3 and 5, or of any other desired form so that the post can be turned by a wrench or other tool. To prevent the posts from dropping out of the bearing tubes when the induction head is removed from the air and water intake chamber during erection, inspection or repairing, each post is provided with a retaining pin 50 extending across the upper end of the respective bearing tube and thus acting as a stop.

Upon turning the adjusting posts in one direction the induction head will be raised and increase the cross sectional area of the conical induction passage 33 and permit a larger volume of air and water to flow downwardly through the same, but when these posts are turned in the opposite direction the induction head is permitted to descend by gravity and decrease this area and the volume of air and water flowing through the induction passage accordingly.

As shown in the drawings the adjusting posts must be turned individually, but if desired these posts may be turned in unison by any suitable operating mechanism.

From the lower end of the compression pipe 22 the compressed air and water are separated by means which embody this invention and are constructed as follows:

The numeral 51 represents a separating tank having preferably the form of a horizontal cylinder which is arranged underground the requisite distance. The lower part of the interior of this separating tank forms a water chamber 52 and the upper part thereof an air chamber 53. The lower end of the compression pipe extends downwardly through the top of the separating tank adjacent to one end thereof and communicates with one end of a discharge pipe 54 arranged lengthwise in the lower part of the separating tank, as shown in Fig. 1. The opposite end of the discharge pipe connects with the lower small end of an upwardly flaring or bell-shaped outlet 55, the large upper end of which opens upwardly and is spaced from the top and sides of the separating tank so that the mixed air and water escaping from this outlet can spread out in all directions and thus expedite the separation of the air and water in this tank. The separated air accumulates in the upper part of the tank where it is stored in a compressed condition and is withdrawn therefrom for use wherever required by means of a delivery pipe 65 which extends from the upper part of this tank adjacent to the opposite end thereof to a point above the level of the ground and provided with any suitable valve means for controlling the discharge of compressed air therefrom.

The water which is separated from the compressed air is returned from the lower part of the separating tank to the ground level reservoir 10 by an upright return pipe having a main upper section 56 surrounding the downtake compression pipe 22 and communicating at its upper end with the lower part of the water reservoir at one end thereof, and a lower section 57 extending from the lower end of the upper section 56 downwardly into the separating tank adjacent to the compression pipe and terminates at its lower end 58, which is of downwardly flaring shape, short of the bottom of the separating tank. By means of the bell-shaped lower end of the return pipe the entrance of the water into the same is facilitated and the operation of circulating the water for reuse to compress air is expedited.

As the water passes from the bell-shaped outlet 55 of the compression pipe through the separating tank to the return pipe 57, 56 the same is compelled to flow in a direct or straight path by means of a baffle which preferably consists of a plurality of intersecting horizontal and vertical plates 59, 60 arranged to form between them a plurality of horizontal cells 61. As the water passes through these cells the same is prevented from whirling or forming a vortex in the separating chamber or tank and thus cause the water to flow more rapidly through this part of the apparatus for promoting the compression of air.

The bottom of the separating tank is preferably provided immediately below the return pipe section 57 with a depression or sump 62 in which sediment from the water is adapted to collect. At intervals this sediment is agitated by means of a jet of compressed air which is supplied through a blow-off or agitating air pipe 63 extending downwardly from above the ground through the return pipe 56, 57 and terminating at its lower end immediately above the sump 62 and provided at its upper end with a hand valve 64 for controlling the delivery of air from the air pipe 63 toward the sump.

By agitating the sediment in the sump the same is distributed in the water and prevented from clogging the smaller passages in the pump and the air induction device, thus making it unnecessary to interrupt the operation of the apparatus for this purpose. Replenishing of the water to make up for loss due to evaporation or leakage can be effected easily by supplying the required water to the reservoir.

As the water is constantly pumped upwardly through the uptake pipe 13 from the reservoir 10 to the intake head 15, the water in the latter is maintained at a temperature above the freezing point whereby the air in the air chamber 28 which is surrounded by the water in the intake head is also maintained at a temperature above the freezing point, thereby preventing the water flowing past the induction rings from freezing, thus maintaining the apparatus in operative condition under low temperatures. Owing to the rapidity of the flow of water and the effective manner in which the same is controlled while flowing through this apparatus, freezing of the water as it flows downwardly in the compression pipe 22 is prevented by the protecting effect of the column of water which surrounds the same and which flows constantly upwardly through the water uptake pipe 13.

Although this apparatus is more particularly adapted for use in connection with a gas or air compressing system in which the water is circulated by artificial power the same can also be used in connection with natural falling water in which case the water would only be used once instead of using the same water repeatedly.

As a whole this apparatus is very strong and durable in construction and operates very efficiently in circulating the water with a minimum expenditure of power and the water is so controlled that the cost of producing compressed air is reduced considerably.

We claim as our invention:

1. A hydraulic gas compressor comprising a plurality of downwardly tapering induction rings arranged vertically one above another and separated from each other by annular downwardly tapering induction passages and forming a mixing chamber which is surrounded by the several rings, a water supply chamber communicating with the upper end of said mixing chamber, and an air supply chamber surrounding said rings and communicating with the induction passages between said rings.

2. A hydraulic gas compressor comprising a plurality of downwardly tapering induction rings arranged vertically one above another and separated from each other by annular downwardly tapering induction passages and forming a mixing chamber which is surrounded by the several rings, a water supply chamber communicating with the upper end of said mixing chamber, and an air supply chamber surrounding said rings and communicating with the induction passages between said rings, said rings being progressively smaller from the uppermost to the lowermost of the same.

3. A hydraulic gas compressor comprising a plurality of downwardly tapering induction rings arranged vertically one above another and separated from each other by annular downwardly tapering induction passages and forming a mixing chamber which is surrounded by the several rings, a water supply chamber communicating with the upper end of said mixing chamber, and an air supply chamber surrounding said rings and communicating with the induction passages between said rings, said rings being progressively smaller from the uppermost to the lowermost of the same and each of said rings which is arranged above another having its inner edge lapping over the outer edge of the next lower of said rings.

4. A hydraulic gas compressor comprising a plurality of downwardly tapering induction rings arranged vertically one above another and separated from each other by annular downwardly tapering induction passages and forming a mixing chamber which is surrounded by the several rings, a water supply chamber communicating with the upper end of said mixing chamber, an air supply chamber surrounding said rings and communicating with the induction passages between said rings, and upright webs arranged within said mixing chamber and having their outer edges connected with the several rings.

5. A hydraulic gas compressor comprising a plurality of downwardly tapering induction rings arranged vertically one above another and separated from each other by annular downwardly tapering induction passages and forming a mixing chamber which is surrounded by the several rings, a water supply chamber communicating with the upper end of said mixing chamber, an air supply chamber surrounding said rings and communicating with the induction passages between said rings, said rings being progressively smaller from the uppermost to the lowermost of the same, and a plurality of upright radial webs arranged in said mixing chamber and having lower portions which engage each other and laterally extending upper portions which are connected with said rings.

6. A hydraulic gas compressor comprising a plurality of downwardly tapering induction rings arranged vertically one above another and separated from each other by annular downwardly tapering induction passages and forming a mixing chamber which is surrounded by the several rings, a water supply chamber communicating with the upper end of said mixing chamber, an air supply chamber surrounding said rings and communicating with the induction passages between said rings, said rings being progressively smaller from the uppermost to the lowermost of the same, and each of said rings which is arranged above another having its inner edge lapping over the outer edge of the next lower of said rings, and a plurality of upright radial webs arranged in said mixing chamber and each web being provided at its outer edge with a plurality of slots which receive the inner edges of said rings and a plurality of fingers each of which is interposed between the underside of an upper ring and upper side of a lower ring.

7. A hydraulic air compressor comprising induction means for mixing air and water, an air chamber surrounding said induction means and supplying air thereto, air intake tubes extending upwardly from said air chamber and adapted to conduct air into said chamber, and an intake chamber surrounding said intake tubes, air chamber and induction means and having a water space in its lower part from which water is supplied to said induction means and an air space in its upper part from which air is supplied to said air intake tubes.

8. A hydraulic air compressor comprising induction means for mixing air and water, an air chamber surrounding said induction means and supplying air thereto, air intake tubes extending upwardly from said air chamber and adapted to conduct air into said chamber, and an intake chamber surrounding said intake tubes, air chamber and induction means and having a water space in its lower part from which water is supplied to said induction means and an air space in its upper part from which air is supplied to said air intake tubes, said intake chamber being provided in its upper part with air inlet openings.

9. A hydraulic air compressor comprising induction means for mixing air and water, an air chamber surrounding said induction means and supplying air thereto, air intake tubes extending upwardly from said air chamber and adapted to conduct air into said chamber, and an intake chamber surrounding said intake tubes, air chamber and induction means and having a water space in its lower part from which water is supplied to said induction means and an air space in its upper part from which air is supplied to said air intake tubes, said intake chamber being provided in its upper part with air inlet openings and with visors each of which extends downwardly and outwardly from the upper edge of one of said openings.

10. A hydraulic gas compressor comprising induction means for mixing air and water which include a plurality of downwardly tapering induction rings arranged one above another and forming between them a downwardly tapering mixing passage, and adjusting means for adjusting the cross sectional area of said passage comprising an induction head provided with a downwardly tapering bottom which projects into said mixing passage, a side wall projecting upwardly from said bottom, and a top connected with said side wall, said bottom, side wall and top forming a sealed chamber.

11. A hydraulic gas compressor comprising induction means for mixing air and water which include a plurality of downwardly tapering induction rings arranged one above another and forming between them a downwardly tapering mixing passage, adjusting means for adjusting the cross sectional area of said passage comprising an induction head provided with a downwardly tapering bottom which projects into said mixing passage, and means for raising said bottom including upright bearing tubes connected with said bottom and each having a downwardly facing shoulder, rotatable adjusting posts journaled in said bearing tubes and each provided with an upwardly facing shoulder which engages with the downwardly facing shoulder of the respective bearing tube, and a plurality of screw nuts mounted on one of said induction rings and each receiving a lower screw threaded end on one of said posts.

12. A hydraulic gas compressor comprising induction means for mixing air and water, an uptake pipe for conducting water upwardly to said induction means, a compression pipe for conducting mixed air and water downwardly from said induction means, and supporting and centering means interposed between said compression pipe and uptake pipe and consisting of a collar surrounding the compression pipe and provided with laterally projecting fins engaging the bore of said uptake pipe.

13. A hydraulic gas compressor comprising a water supply reservoir, elevated induction means for mixing air and water, pumping means for supplying water to said induction means from said reservoir, a compression pipe which receives mixed air and water from said induction means, a separating chamber which receives the mixed air and water from said compression pipe, and a return pipe which returns the water from said separating chamber to said water supply reservoir and which has an upper section surrounding said compression pipe and a lower section which projects downwardly into said separating chamber outside of said compression pipe.

14. A hydraulic gas compressor comprising a water supply reservoir, elevated induction means for mixing air and water, pumping means for supplying water to said induction means from said reservoir, a compression pipe which receives mixed air and water from said induction means, a separating chamber which receives the mixed air and water from said compression pipe, a return pipe which returns the water from said separating chamber to said water supply reservoir, a sump for sediment arranged in the bottom of said separating chamber, and a sediment blowout pipe having its outlet arranged over said sump.

15. A hydraulic gas compressor comprising a water supply reservoir, elevated induction means for mixing air and water, pumping means for supplying water to said induction means from said reservoir, a separating tank, a compression pipe whereby mixed air and water is taken from the induction means and delivered into one end of said separating chamber, a return pipe whereby water is taken from the opposite end of said separating chamber and delivered to said reservoir, and baffle means arranged in said separating chamber between the outlet of said compression pipe and the inlet of said return pipe and adapted to prevent the water from forming a vortex while passing from said water inlet to the water outlet in the separating chamber.

16. A hydraulic gas compressor comprising a water supply reservoir, elevated induction means for mixing air and water, pumping means for supplying water to said induction means from said reservoir, a separating tank, a compression pipe having its inlet connected with the induction means for receiving mixed air and water therefrom and having a flaring outlet arranged in the separating chamber for discharging the mixed air and water thereto, and a water return pipe connecting said separating chamber and water supply reservoir.

GROVER C. JOHNSON.
JAMES W. HATHAWAY, Sr.